April 27, 1954  O. F. WYSS ET AL  2,676,694
APPARATUS FOR THE UNIFORM DISPENSING OF POURABLE
MATERIAL, PARTICULARLY SHAVINGS, CHIPS, AND
FIBROUS MATERIAL, FROM STORAGE BINS
Filed Oct. 10, 1950
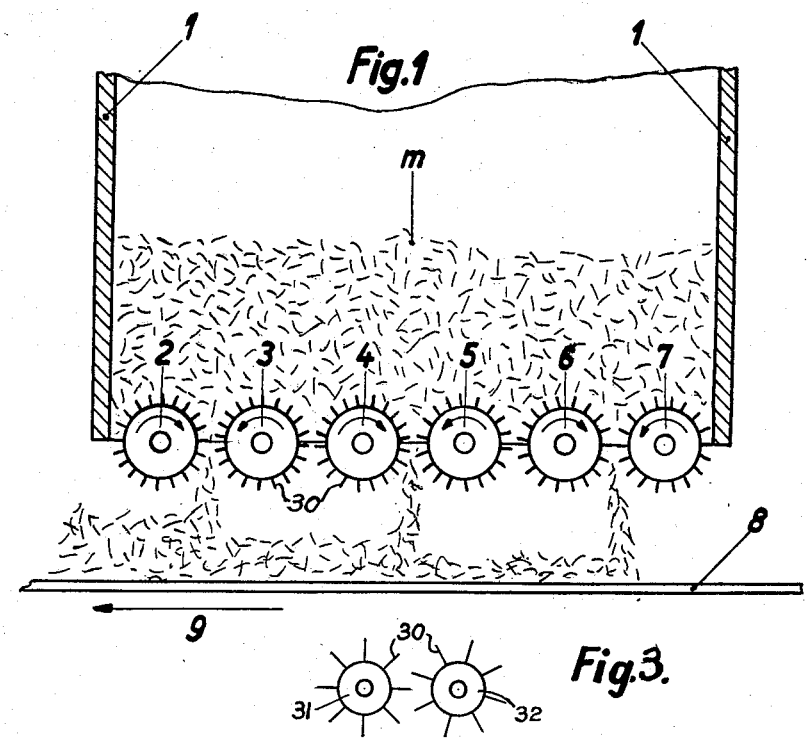
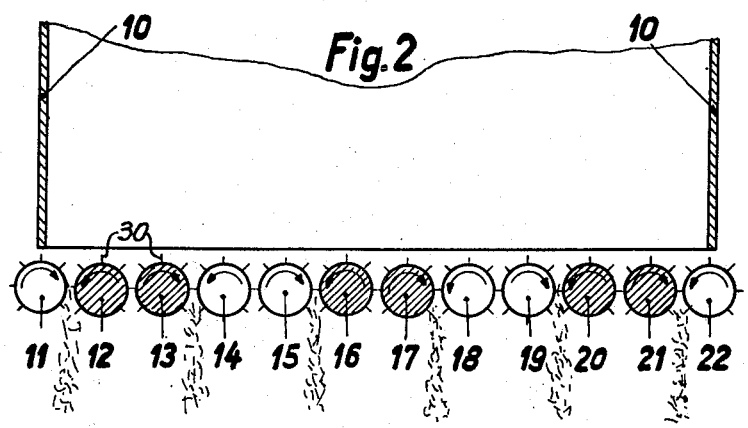
INVENTORS:
OSWALD FIDEL WYSS
KLAUS STEINER
BY C. M. Avey
ATT'Y Patented Apr. 27, 1954

2,676,694

UNITED STATES PATENT OFFICE 2,676,694

APPARATUS FOR THE UNIFORM DISPENSING OF POURABLE MATERIAL, PARTICULARLY SHAVINGS, CHIPS, AND FIBROUS MATERIAL FROM STORAGE BINS

Oswald Fidel Wyss, Zurich, and Klaus Steiner, Fideris, Switzerland; said Steiner assignor to said Wyss Application October 10, 1950, Serial No. 189,312

1 Claim. (Cl. 198—56)

The invention relates to storage bins and the like containers for pourable solid materials, particularly materials composed of chips, shavings, fibers or the like particles and has for its general object to provide such bins or containers with dispensing apparatus capable of continuously and uniformly discharging this kind of material from the storage space.

Granular pourable materials are often stored in bins that are charged from above and permit a continuous discharge from the bottom. These bins, however, are not readily applicable for pourable materials composed of chips, shavings, fibers or the like more or less loosely stapled substances such as wood fibers. Particles of this kind have the tendency to locally hang or bunch together, thus bracing one another across hollow spaces within the storage bin. Due to this behaviour and the often very low volumetric density of these substances, the stored material does not always or not regularly slide down when material is dispensed from the bottom of the bin. Hence, a continuous and uniform discharge cannot be counted upon.

For that reason the manufacture of pressed sheets and other molded articles from the mentioned materials, as well as other industrial processes requiring a continuous and uniform introduction of such materials into the course of fabrication, have either been carried out without the benefit of bottom discharge bins, or special auxiliary devices have been provided to cope as well as possible with the above-mentioned difficulties. The auxiliary devices so far proposed for such purpose leave much to be desired and usually require rather intricate equipment which must ofen be actuated by hand or must be continuously supervised. Indeed, in many cases, especially in smaller manufacturing plants, the uniform introduction of the mentioned materials into the fabricaing process has remained a substantially manual matter; despite the fact that, particularly in larger plants, the provision of one or several storage bins which receive the pourable material from the source of supply is considered desirable because such bins secure a uniform dispensing of the raw material irrespective of supply stoppages and other irregularities of production and supply. A dispensing of the material from the bottom of the bin also prevents that material located in the bottom zone from permanently remaining in the bin, from changing its moisture content, and from becoming lumpy or otherwise spoiled, thus assuring that only freshly supplied material is dispensed into the fabricating process. Mixing devices within the storage bins offer only partial relief. Consequently, a uniform and continuous bottom discharge of the materials here in question, especially in a manner not requiring manual operation or supervision, is a matter of considerable importance for the interested industries.

It is, therefore, a more specific object of the present invention to provide a storing and dispensing apparatus for pourable materials composed of chips, shavings, fibers or the like particles that affords a continuous and highly uniform bottom discharge of the stored materials with the aid of simple devices suitable for fully automatic operation and requiring no continuous supervision.

To this end, and in accordance with the invention, a storage bin or container has a bottom discharge opening equipped with a plurality of pairs of mutually adjacent rotating rake devices, the bin being designed, for instance, as a storage well, tower or silo.

These and more specific features of the invention will be apparent from the embodiments illustrated in the drawings, in which Figure 1 shows schematically the horizontal cross section of an apparatus according to the invention in conjunction with a conveyor for receiving the dispensed material, Fig. 2 shows schematically and also in a verticcal cross section a modified apparatus, and Fig. 3 shows one rake pair of a somewhat modified design applicable in apparatus otherwise designed in accordance with Fig. 1.

In Fig. 1, the vertical side walls of a storage bin are denoted by 1. The bin is charged with material from the top and has an opening at its bottom through which the material is dispensed. The bottom opening, however, is almost closed by a group of rotating rake drums denoted by 2 through 7, respectively. Each of the rake drums has a large number of radially and axially distributed spikes, prongs, vanes or the like rake elements such as those denoted by 30. When the rake drums are at rest, the stored fibers or the like material $m$ is confined within the bin. The dimensioning of the rake drums and the number, shape, length and thickness of their individual rake members, such as spikes, prongs, wires or the like is to be chosen in accordance with the character and behaviour of the particular material to be stored and dispensed.

The discharge of the material from the bin is effected by rotating the rake drums. Each two adjacent rakes rotate in opposition to each other as is indicated by arrows. Then the direction of rotation of two adjacent rake drums appertaining to a single pair is directed downwardly at the rake drum sides facing each other. Consequently, the material is dispensed between the two rake drums of each pair, while no discharge of material occurs at those places where two adjacent drums have an upwardly directed sense of rotation.

The follow-down movement of the material within the bin and hence the always uniform discharge of material is considerably improved if within each pair of rake drums the two rakes have different speeds of rotation, respectively. In this case, all faster rotating drums on the one hand and all more slowly rotating drums on the other hand are preferably given the same respective speeds. For instance, in the embodiment of Fig. 1 all clockwise rotating drums 2, 4 and 6 rotate at the same speed which, however, is different from the speed of the counterclockwise rotating drums 3, 5 and 7, the latter speed being again the same for the three drums. It will be understood that the drums or their respective shafts are preferably geared together by gear transmissions (not shown) of the proper transmission ratio and may be driven by a single motor.

With an operation of the apparatus as just described, it may happen that the material within the bin may eventually be displaced toward the side of the sense of rotation of the slower drums and hence may be condensed at that side while a hollow space or a space of reduced density may occur at the opposite side. For instance, in the illustrated example, when in Fig. 1, the drums 3, 5 and 7 are the ones rotating at slow speed, a spot of increased density may occur at the left side above the drum 2, and a spot of reduced density or a hollow may occur at the right side above the drum 7. However, such occurrences can readily be prevented by auxiliary means for which two embodiments are described in the following.

According to one embodiment, the rake drive or the drive gear of the apparatus is provided with reversing means which change the sense of rotation of the individual drums in desired intervals of time, and these intervals may be adapted to the behaviour of the particular material to be stored and dispensed. After a reversal of rotation, for instance, in the apparatus of Fig. 1, the drums 3 and 4 will form a pair whose individual drums rotate downwardly toward each other, and this is then also the case with the drums 5 and 6. Consequently, after the reversal of rotation the material is dispensed between drums 3 and 4, and between drums 5 and 6, for a given interval of time. Thereafter the rotation again reverses so that the material again issues from between drums 2 and 3, drums 4 and 5, and drums 6 and 7, as shown in Fig. 1.

According to another embodiment, the design is such that within the pairs of drums whose individual drums rotate at different respective speeds, the sequence of slow and fast speeds is changed from pair to pair, preferably in such a manner that each two adjacent drums appertaining to successive drum pairs have the same speed of rotation. In this case, the sequence of the fast and slow rotating drums of each drum pair is reversed relative to the corresponding sequence in the preceding pair, the rotation of the two drums of each pair remaining always downwardly directed between the drums of the pair. The apparatus illustrated in Fig. 2 exemplifies the just-mentioned features.

In Fig. 2, the lateral walls of the storage bin are denoted by 10. The bottom opening of the bin is substantially covered by a group of discharge drums 11 through 22 which in this case are schematically represented by circles and whose directions of rotation are indicated by respective arrows. The circles denoting the fast rotating drums are cross hatched. It will be recognized that the slowly rotating drum 11 is followed by a fast rotating drum 12 with which it forms a discharge pair. Adjacent to drum 12 is another fast rotating drum 13 which rotates in the opposite direction so that no discharge of material occurs between drums 12 and 13, the speed of drums 12 and 13 being preferably the same. Following the drum 13 is a drum 14 which rotates slowly in the opposed direction and forms another discharge pair together with drum 13. The just-mentioned arrangement of four drums can be repeated once or several times in accordance with the requirements or desiderata of the particular application, three such groups of four drums being shown in Fig. 2. Such a sequence of drums has the additional advantage that the drums at the ends of the row, i. e. in the illustrated example the drums 11 and 12, rotate both at slow speed and have such a direction of rotation that they shift the material toward the interior of the bin space, thus preventing a lateral escape of the material from the bin.

It has been mentioned that the number, shape, length and thickness of the rake members is preferably adapted to the particularities of the material to be dispensed. In connection therewith it is especially advantageous if the rake members of the faster drums have a length different from those of the slower drums. The deformation in length is preferably such that the rake members of the faster rotating drums is larger than those of the slow drums. The number, shape and thickness of the rake members on the fast rotating drums may also be different from the rake members of the slow drums. For instance, the diameters of the respective drum bodies of the fast drums may differ from the diameters of the drum body of the slowly rotating drums. All embodiments and modifications in dimensions are preferably selected and combined in consideration of the properties and behaviour of the material to be dispensed. One of the applicable measures and advantageous in many cases is a drum arrangement in which the rake drums are spaced from one another such an amount that the circles of rotation of the rake member tips of adjacent drums have a desired distance from each other. This is the case in the embodiments of Figs. 1 and 2. On the other hand, the arrangement and design of the rake drums may also be chosen so that the rake members of one drum are staggered relative to those of the adjacent drums of each pair and that the rake members of respective adjacent drums have such a distance from each other that the respective tip circles intersect. This is shown in Fig. 3 for one pair of rake drums 31 and 32.

Depending upon the kind and behaviour of the material to be dispensed, it is sometimes also preferable to arrange the rake members of a drum in helical rows. For instance, only the rake members on the fast rotating drums, or only those on the slow rotating drums may be thus arranged.

The material discharged from the storage bin in the manner described in the foregoing can be continuously or periodically withdrawn or conveyed by various suitable devices. For instance, in Fig. 1, part of an endless conveyor band 8 is shown. The band moves in the direction of the arrow 9. However, instead of such conveyor means, one or several receiving, transportation or form boxes or the like containers may be placed beneath the bottom of the bin before the dispensing apparatus is put in operation. After a given period of time or after reaching a predetermined weight of the material received in the container, the dispensing device is stopped and the filled container is exchanged for an empty one.

We claim:

Apparatus for dispensing a layer of pourable fibrous and dry material composed of chips, shavings, fibers and the like wood particles with bunching tendencies, comprising an upwardly open storage container to be charged with material, said container having a bottom discharge opening, a multiplicity of pairs of rotating rake devices disposed side by side in parallel relation to each other and substantially covering together said discharge opening, all of said devices having respective cylindrical rake drums of the same diameter and having respective axes of rotation located in a single substantially horizontal plane, the two devices of each pair having a downward direction of rotation at the respective adjacent sides so that an amount of material is discharged between and axially along said two devices of each pair, and a surface conveyor disposed beneath said devices and having a travelling direction transverse to the axes of rotation of said devices, whereby the individual amounts of material discharged between said respective pairs are placed on top of each other to jointly produce on said conveyor a layer of material of a desired total thickness.

References Cited in the file of this patent

UNITED STATES PATENTS

| Number | Name | Date |
|---|---|---|
| 216,617 | Jaquett | June 17, 1879 |
| 255,494 | Curtis et al. | Mar. 28, 1882 |
| 314,652 | Clark | Mar. 31, 1885 |
| 428,768 | Decollogne | May 27, 1890 |
| 677,386 | Teegaurden et al. | July 2, 1901 |
| 781,671 | Meri | Feb. 7, 1905 |
| 1,510,578 | Bahr | Oct. 7, 1924 |
| 1,515,181 | Toomey | Nov. 11, 1924 |
| 1,570,032 | Baldner | Jan. 19, 1926 |
| 2,523,642 | Becker | Sept. 26, 1950 |

FOREIGN PATENTS

| Number | Country | Date |
|---|---|---|
| 8,316 | Great Britain | Feb. 11, 1909 |